Aug. 30, 1960 C. M. BOLSTER ET AL 2,950,751
EMERGENCY TIRE
Filed Feb. 26, 1957 3 Sheets-Sheet 1

INVENTORS
Calvin M. Bolster
Joseph P. Kaenan
Paul O. Pfeiffer
BY McCoy, Greene + te Grotenhuis
ATTORNEYS INVENTORS
Calvin M. Bolster
Joseph P. Kaenan
Paul O. Pfeiffer Aug. 30, 1960

C. M. BOLSTER ET AL 2,950,751

EMERGENCY TIRE

Filed Feb. 26, 1957

INVENTORS
Calvin M. Bolster
Joseph P. Kaenan
Paul O. Pfeiffer
BY
ATTORNEYS

United States Patent Office 2,950,751
Patented Aug. 30, 1960

2,950,751

EMERGENCY TIRE

Calvin M. Bolster, Joseph P. Kaenan, and Paul O. Pfeiffer, Akron, Ohio, assignors to The General Tire & Rubber Company, Akron, Ohio, a corporation of Ohio Filed Feb. 26, 1957, Ser. No. 642,447

8 Claims. (Cl. 152—330)

This invention relates to an emergency tire for automobiles and other vehicles using pneumatic tires which can be mounted upon a deflated tire to permit the automobile or other vehicle to be driven from the place where the tire failure occurs to a service station or other place where the damaged tire can be conveniently removed and repaired.

The emergency tire of the present invention is in the form of a fabric reinforced inflatable tube that is molded and vulcanized or cured to a tranversely flat form so that it can be readily placed in a position encircling the tread of a deflated pneumatic tire.

The emergency tire has a tread portion that serves as a restraining band for the inflatable tube when the emergency tire is positioned on the deflated vehicle tire. The emergency tire, except for the tread portion, is readily expansible under inflation pressure but is reinforced with fabric in such manner as to permit expansion in a radial inward direction but to resist transverse stretching. The substantially inextensible tread portion and the fabric reinforcement of the tubular wall enables the emergency tire to apply a relatively great radial inward thrust to the tread portion of a deflated tire throughout its circumference.

When the emergency tire, which is preferably endless and substantially cylindrical, is applied to the periphery of a deflated tire on an automobile wheel and inflated, it applies a radial inward pressure to the tread portion of the deflated tire throughout the circumference of the tire, causing the said tread to collapse into the space between the tire side walls so as to form with the side walls and the rim profile a circumferential recess into which the emergency tire is expanded, to which the emergency tire conforms and in which the emergency tire is retained.

Since the tread of an automobile tire is not circumferentially contractible, circumferential undulations are formed in the deflated tire on the vehicle wheel when the tread is forced radially inwardly to occupy a space within a circle of a diameter less than the normal external diameter of the tire. These undulations provide an efficient driving connection between the emergency tire and the deflated tire and prevent circumferential slippage of the emergency tire with respect to the deflated tire.

The emergency tire may be made with a relatively thin and flexible tread which will permit folding of the emergency tire into a compact bundle for storage in the trunk compartment of an automobile or otherwise carried in the vehicle. It may also be folded for storage in such manner as to be available for the positioning of elongated portions of the emergency tire in side by side relation. Thus it is adapted to lie flat on the ground in front of or to the rear of a wheel having a deflated tire thereon, with a sufficient portion thereof exposed to permit the wheel with the deflated tire thereon to be rolled onto the exposed portion, after which the remainder of the emergency tire may be swung upwardly into position around the periphery of the deflated tire.

The emergency tire may also be applied to a deflated tire that has been lifted off the ground by jacking up the vehicle.

The many advantages of the invention will be apparent from the accompanying drawings and the following description.

Reference should be had to the accompanying drawings forming a part of this specification, in which:

Figure 1 is a side elevation showing an automobile wheel with a deflated tire thereon and having the emergency tire of the present invention mounted upon the deflated tire;

Fig. 2 is a transverse section on an enlarged scale through the inflated emergency tire positioned on a deflated pneumatic tire mounted on a wheel rim, the section being taken on the line indicated at 2—2 in Fig. 1 to show the transverse contour of the inflated emergency tire and the deflated tire at the peripheral high point or node of the deflated tire, the deflated tire and the rim being shown in dotted lines;

Figure 1:
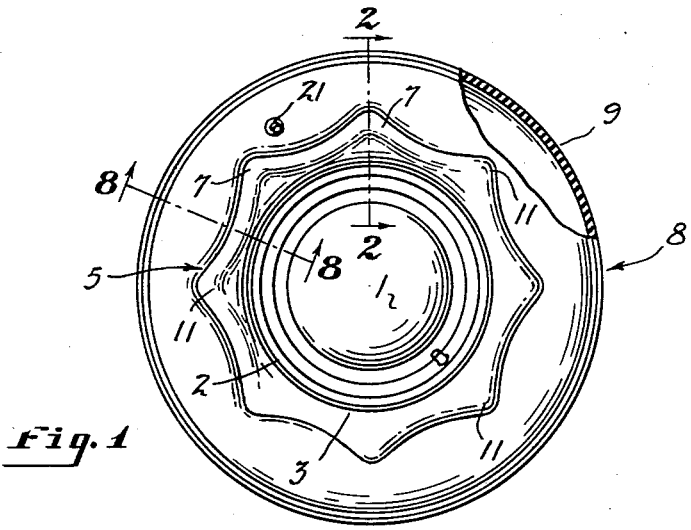
Figure 2:
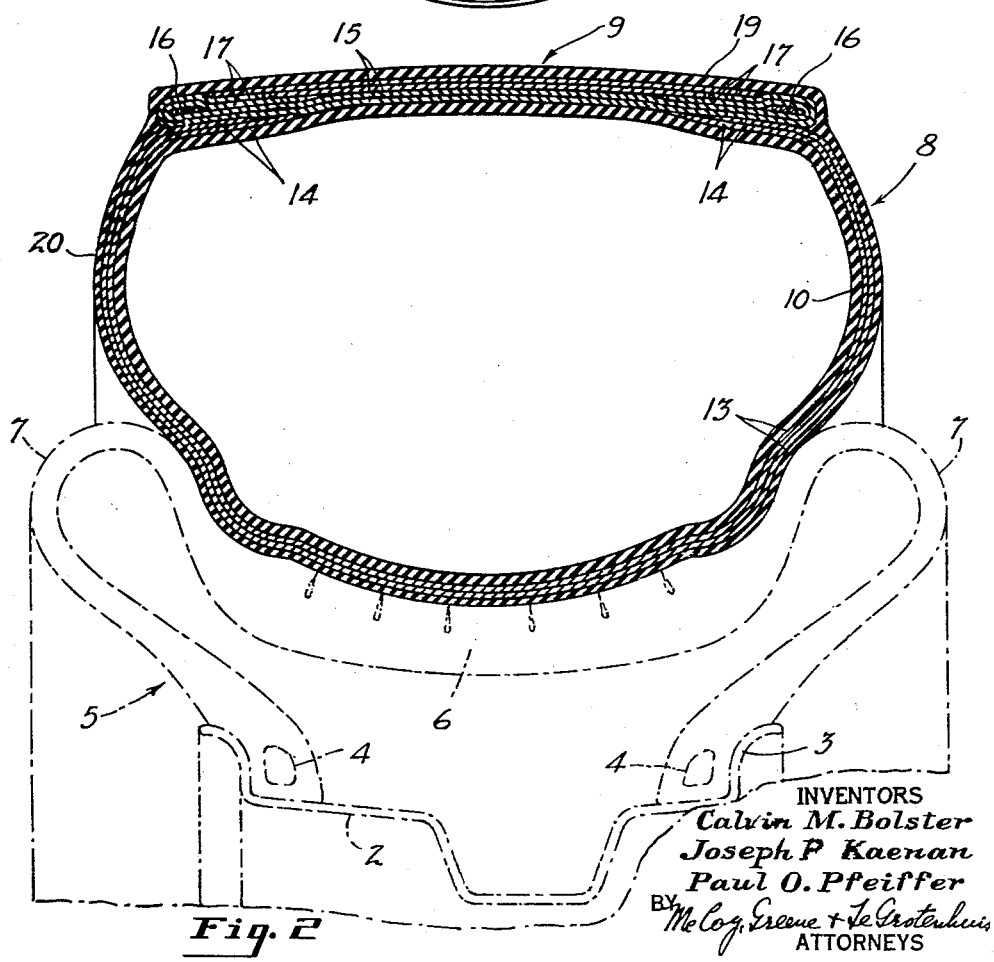

In the accompanying drawings the emergency tire of the present invention is shown in preferred embodiment as applied to an automobile wheel 1 having a rim 2 provided with side flanges 3 which retain the beads 4 of a conventional automobile tire 5, which has a relatively thick tread 6 and relatively thin flexible side walls 7. An emergency tire 8 is shown mounted on the wheel and this tire has a tread portion 9 that provides a substantially inextensible restraining band. The emergency tire 8 has a tread portion 9 and an inflatable tube or carcass 10 which upon inflation expands radially inwardly from the tread portion 9.

The emergency tire is first placed around the periphery of the deflated tire and is then inflated to force the tread of the deflated tire radially inwardly into the space between the side walls 7 of the deflated tire to provide a peripheral recess between the side walls of the deflated tire into which the emergency tire is expanded and to which the interior of the emergency tire conforms. The relatively wide and deep channel formed by the deflated tire and rim serves to securely attach the emergency tire to the wheel when inflated.

Since the vehicle tire tread 6 is not circumferentially contractible to any appreciable extent, it is forced to assume a circumferentially undulating form when forced radially inwardly throughout its circumference. It has been found that conventional passenger car deflated tires will form from six to nine fairly regularly spaced nodes, such as the nodes 11 shown in Fig. 1, when collapsed by the emergency tire. The emergency tire is built and vulcanized to a substantially cylindrical form with its radially interior and exterior walls substantially flat and disposed closely adjacent to one another.

The body or carcass 10 of the tire is in the form of an air impervious elastic inner layer or tube that is reinforced by two layers of cord fabric 13 which extend transversely across the inner face of the tube with their opposite edge portions 14 extending around the edge portions and partially across the outer face of the tube 10.

The emergency tire may be built upon a cylindrical form by first forming the cylindrical endless tube 10 with the fabric plies 13 covering the interior thereof and extending around the edges and partially across the exterior face of the tube 10. The reinforcing fabric is bias cut cord fabric having diagonal cords and having cords of successive plies disposed in crossing relation. Two plies of the fabric 13 are generally sufficient for use with conventional passenger car tires. The helix angle of the cords is preferably not greater than 45°. Plies 15 of bias cut cord fabric are laid upon the exterior of the tube 10 and extend across the space between the opposite edges of the reinforcing plies 13 and overlap the edges thereof. The helix angle of the cords in the plies 15 is greater than 45° and preferably from 50° to 70°, two plies being usually sufficient.

Inwardly of the side edges of the tube, strong steel wire cables 16 are wound around edge portions of the plies 15 that overlie the edge portions 14 of the fabric plies 13. The two groups of wire cables 16 form inextensible beads spaced inwardly from the side edges of the flat tube and the side and edge portions 17 of the fabric plies 15 are folded over the exterior of the bead cables 16 and adhered to the exterior face of the plies 15 inwardly of the bead cables. Plies of bias cut cord fabric 18 are applied exteriorly across the space between and overlapping the edges 17 of the fabric plies 15. Two plies of fabric 18 are usually sufficient for an emergency tire to be used on automobiles. The plies are laid with the cords of successive plies in crossing relation and disposed at a helix angle greater than 45° and preferably from 50° to 70°. The bead cables 16 and the superposed plies 15 and 18 of the cord fabric form the tread portion 9 of the emergency tire, the side edges of the tread portion being inextensible because of the bead rings formed by the cables 16, and the expansion of the tread between the bead cables being restricted by disposing the cords of the reinforcing plies 15 and 18 at a relatively small angle to the median plane of the tread.

Figure 7:
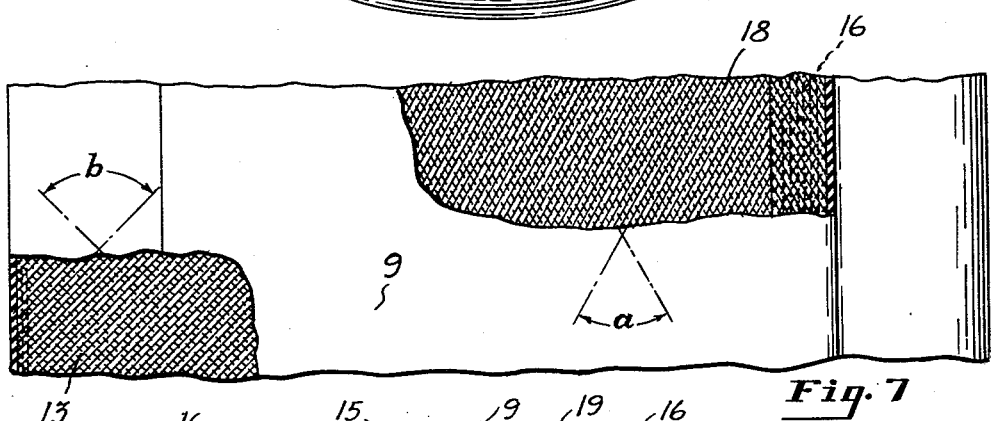
Fig. 7 is a fragmentary bottom plan view taken as indicated at 7—7 in Fig. 4 and showing the arrangement of the cords of the tread and of the tube reinforcing fabric.
Figure 8:
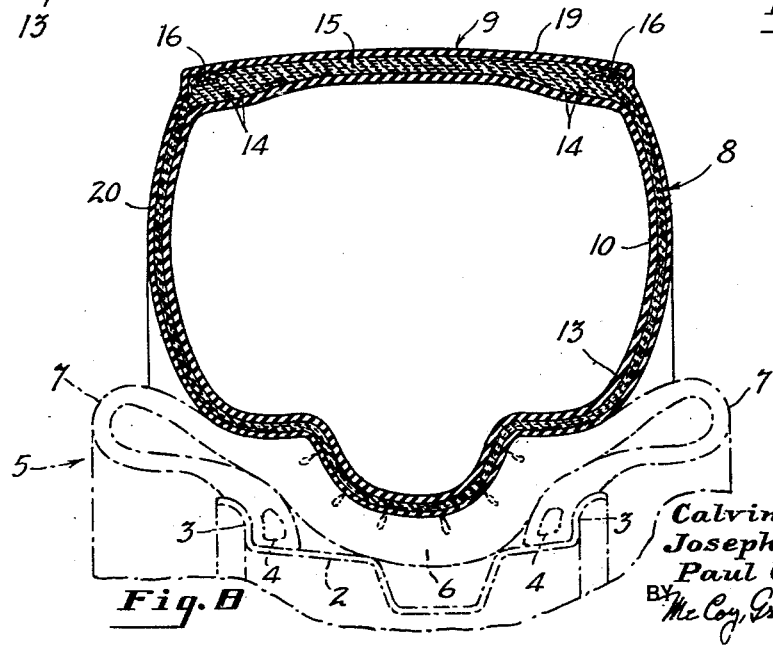
Fig. 8 is a view showing the cross sectional outline of the inflated emergency tire and the deflated vehicle tire at a peripheral low point or antinode, the section being taken on the line indicated at 8—8 in Fig. 1.

As shown in Fig. 7, the reinforcing cords in the tread portion of the tire are disposed at a high helix angle as indicated by the lines a, so as to resist circumferential stretch due to inflation pressure and the reinforcing cords of the tube 12 are disposed at a lower helix angle as indicated by the lines b which will provide the necessary stability and resistance to stretch without substantially impeding expansion in an inward direction.

The reinforcing plies are formed of rubberized fabric so that the cords are fully embedded in rubber in the vulcanized emergency tire. A layer of tread rubber 19, which is much thinner than the tread rubber of a conventional tire and which may be, for example, from $\frac{1}{16}''$ to $\frac{1}{8}''$ thick, covers the tread portion of the emergency tire and a thinner layer 20 of rubber covers the remainder of the tire. A valve stem 21 is provided adjacent an edge of the flat tubular tire, being disposed where it will be readily accessible after the flat tubular emergency tire is placed around a deflated vehicle tire.

The inflation of the emergency tire can be conveniently accomplished by means of a carbon dioxide cartridge which will eliminate the necessity for an air pump and the manual labor incident to inflation of the tire by means of such a pump.

Figure 3:
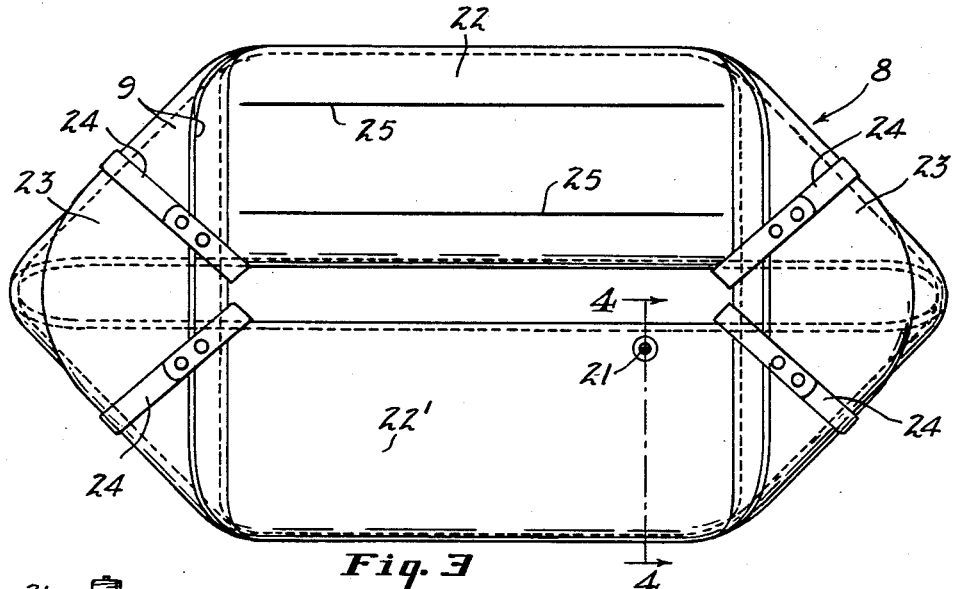
Fig. 3 is a plan view of the emergency tire folded to lie flat on the ground and provided with means to hold it in the position shown so that it may be positioned on the ground immediately to the front or rear of a wheel carrying a deflated tire so that a tread engaging portion of the emergency tire may be so positioned as to permit the wheel to be rolled onto it.
Figure 4:
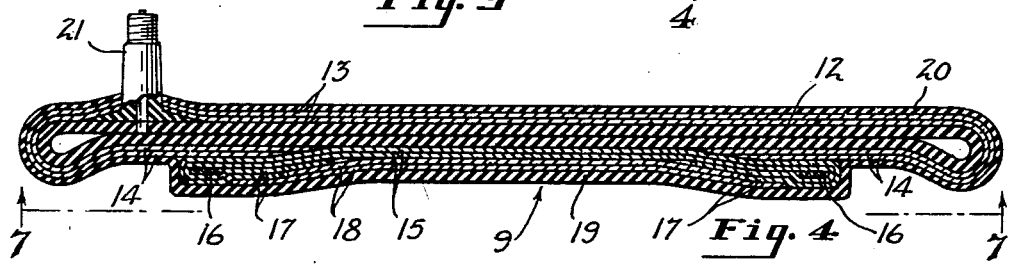
Fig. 4 is a transverse section through the emergency tire taken on the line indicated at 4—4 in Fig. 3.
Figure 5:
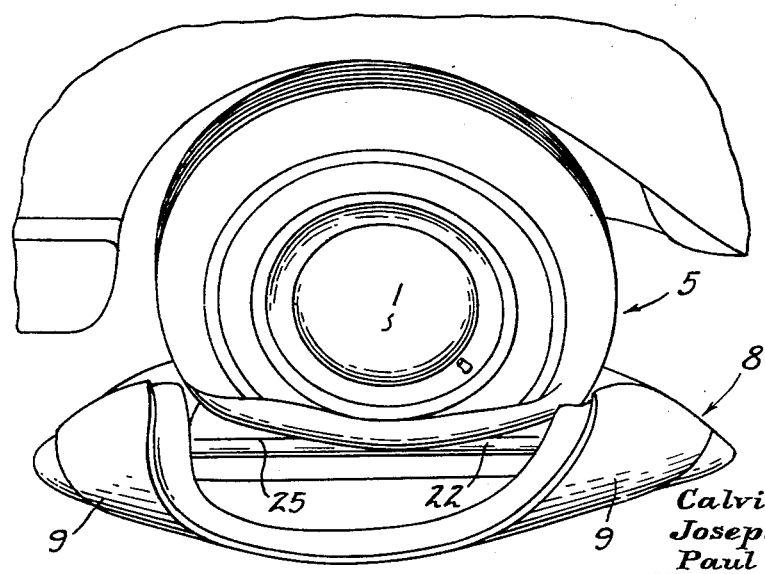
Fig. 5 is a perspective view, showing an automobile wheel placed on a flat portion of the emergency tire and in a position where the remainder of the emergency tire can be readily placed around the tread of the deflated tire.
Figure 6:
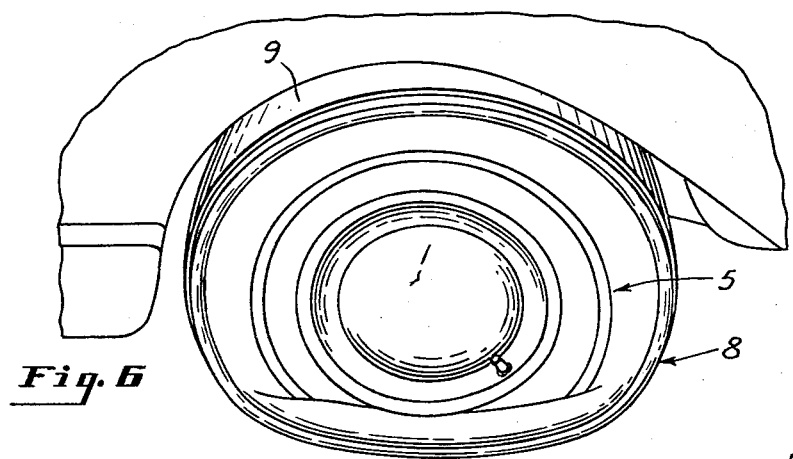
Fig. 6 is a perspective view showing the uninflated emergency tire in place around the tread of the deflated tire.

As shown in Fig. 3 of the drawings, the emergency tire may be folded to dispose diametrically opposite portions 22 and 22' side by side in parallel relation and triangular end portions 23 folded across the ends of the parallel portions 22 and 22'. To retain the tire in folded condition as shown, detachable retaining straps 24 may be provided for holding the triangular portions 23 substantially flat against the portions 22 and 22'. With the tire so folded, it can be laid upon the ground with the tread portions 9 facing downwardly across the parallel exposed portions 22 and 22' and can be placed to the front or to the rear of a vehicle wheel, with one of the portions 22 or 22' in the line of travel of the wheel, so that the wheel can be rolled onto the exposed portion 22 or 22', after which the straps 24 may be released and the free portions of the emergency tire swung up to a position surrounding the automobile tire. The emergency tire is folded to dispose the valve stem 21 adjacent the inner edge of the flat portions 22' as shown in Fig. 3. In order to dispose the valve stem 21 at the outer side of the emergency tire after assembly on the deflated tire the folded emergency tire should be placed with the vehicle tire receiving portion 22 opposite the portion 22' having the valve stem. In order to facilitate the proper positioning of the folded tire with respect to an automobile wheel, the face of the portion 22 which is to be alined with the deflated tire to which the emergency tire is to be applied, may have lines 25 such as shown in Fig. 3 marked thereon.

The present invention accomplishes important results long desired in the automobile industry, namely: the elimination of the disagreeable labor incident to the changing of wheels and tires, the lessening delays incident to tire failure and the reduction in the storage compartment space required for such spare wheels and tires.

The emergency tire of the present invention can be quickly and easily applied to a deflated tire without the use of jacks, so that the vehicle may be driven at normal speed for many miles if desired to a convenient place for repairing or replacing the damaged tire. The lessening of the time during which a motor vehicle is stopped on a highway reduces the danger of personal injury and also reduces the interference with normal highway traffic.

The delays in clearing landing field runways incident to failure of an aeroplane landing gear tire often causes serious inconvenience. The device of the present invention provides a quick and easy way to restore the operativeness of a plane supporting wheel so that the plane can be taxied off the runway.

The emergency tire of the present invention can be folded into a compact bundle which occupies but little space in a storage compartment of a vehicle and the storage space in the trunk or other compartment heretofore occupied by a spare tire and wheel is made available for storage of other articles, and, if desired, car bodies may be designed to reduce the size of such compartments and to utilize the space formerly required for the spare wheel and tire for other purposes.

It is to be understood that in accordance with the provisions of the patent statues, variations and modifications of the specific devices herein shown and desired may be made without departing from the spirit of the invention.

What we claim is:

1. The combination with a vehicle wheel having a deflated tire mounted thereon that has a flexible substantially incontractible tread and flexible side walls, of an inflatable external tire comprising a fabric reinforced endless tube that is substantially flat in transverse section and of uniform width from edge to edge when uninflated, that is of such size as to exteriorly fit upon said deflated tire tread and that has a substantially inextensible tread portion on its exterior face, said tube being inflatable and expansible radially inwardly upon inflation to apply radial inward pressure throughout the circumference of the tread of the deflated tire to collapse the same into the space between said deflated tire side walls which provide a recess to which said tube conforms.

2. The combination with a vehicle wheel having a deflated pneumatic tire mounted thereon that has flexible side walls and a flexible substantially incontractible tread that is collapsed to a circumferentially undulating shape between said side walls to form a recess having an undulating bottom, of an emergency tire comprising an inflated fabric reinforced body encircling said deflated tire conforming to said recess and projecting radially outwardly beyond said deflated tire.

3. An emergency tire for use on a deflated pneumatic vehicle tire comprising a flexible endless tread that is substantially flat in transverse section, that has an inextensible bead ring therein adjacent each of its side edges and that has fabric reinforcing plies anchored at their edges to said bead rings, and an endless tube that is collapsed against the interior of said tread, that is substantially flat in transverse section and of a width greater than said tread, that lies within said tread, that is secured to the interior of the tread with side edge portions projecting past the side edges of said tread and that is reinforced by fabric plies secured to the tread and extending from one edge of the tread transversely around the inner portion of the tube to the opposite edge of the tread, said tube being inflatable and expansible radially inwardly from said tread upon inflation.

4. An emergency tire for use on a deflated pneumatic vehicle tire comprising an endless inflatable tube that is substantially flat in transverse section with closely spaced interior and exterior walls of substantially uniform perimeter, an endless tread band on said exterior wall that is flexible and substantially inextensible that is narrower than the flat tube and that is spaced inwardly from the side edges of the flat tube, fabric plies reinforcing said tube and composed of cords extending transversely from one side edge of said tread around the inner portion of the tube to the opposite side edge of said tread, circumferentially extending reinforcing cables in said tread for resisting circumferential stretch, and a valve stem attached to said tube and positioned laterally outwardly of said tread when the tube is flat.

5. An emergency tire for use on a deflated pneumatic vehicle tire comprising an endless tread that is of substantially uniform perimeter from edge to edge and that is substantially inextensible, an endless flexible inflatable tube of elastic rubber that is collapsed and substantially flat in transverse section, that lies within said tread and that is secured to the interior of the tread, said tube having a fabric reinforcement that resists stretching of the tube, said tube being wider than said tread when flat and projecting beyond opposite side edges of said tread, said tread and tube being flexible and readily foldable when the tube is deflated to place elongated portions of the interior face of said tube flat and side by side and to provide connecting portions of triangular form that overlie the ends of said side by side portions said tube being expansible radially inwardly from said tread upon inflation.

6. An emergency tire for use on a deflated pneumatic vehicle tire comprising an endless inflatable elastic rubber tube that is substantially flat in transverse section and having closely spaced interior and exterior walls of substantially uniform perimeter, an endless tread band of less width than the flat tube secured to the exterior wall of the tube and positioned inwardly of the side edges thereof, said tread band having inextensible reinforcing bead rings within side edge portions thereof, said tread having fabric plies comprising cords extending diagonally across the space between said bead rings in crossing relation, said tube being reinforced by fabric plies having cords extending diagonally from one edge of said tread around the inner portion of the tube to the opposite edge of the tread in crossing relation.

7. The emergency tire as defined in claim 6 in which the cords of the reinforcing plies cross the median plane of the tire at an angle of at least 45 degrees and in which the cords of the tread reinforcing plies are disposed at an angle to the median plane of the tire that is less than 45 degrees.

8. An inflatable emergency tire for encircling engagement with the tread of a deflated pneumatic tire on a vehicle wheel comprising an endless inflatable rubber tube having flexible interior and exterior walls that are substantially flat in transverse section and closely spaced for convenient placement upon the tread of the vehicle tire, a transversely flat circumferentially continuous tread of less width than said exterior wall encircling said exterial wall, and means reinforcing said tread to restrict radial outward expansion thereof and for reinforcing said tube to restrict transverse and longitudinal stretching thereof and to constrain said interior wall and the portions of the exterior wall disposed laterally of the attached tread to move radially inwardly when subjected to inflation pressure.

References Cited in the file of this patent

UNITED STATES PATENTS

| | | |
|---|---|---|
| 604,529 | Hefner | May 23, 1898 |
| 1,198,634 | Hensley | Sept. 19, 1916 |
| 1,554,370 | Renner | Sept. 22, 1925 |
| 1,989,402 | Cupp | Jan. 29, 1935 |
| 2,365,279 | Kraft | Dec. 19, 1944 |
| 2,699,194 | Iknayan | Jan. 11, 1955 |